United States Patent
Moreno et al.

(10) Patent No.: US 7,331,564 B2
(45) Date of Patent: Feb. 19, 2008

(54) NORMALLY OPEN HIGH FLOW HYDRAULIC PRESSURE CONTROL ACTUATOR

(75) Inventors: Alejandro Moreno, El Paso, TX (US); Viswanathan Subramanian, El Paso, TX (US); Santos Burrola, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/112,869

(22) Filed: Apr. 22, 2005

(65) Prior Publication Data

US 2006/0237672 A1 Oct. 26, 2006

(51) Int. Cl.
*F16K 31/02* (2006.01)

(52) U.S. Cl. ............ 251/129.02; 251/284; 137/519.5

(58) Field of Classification Search .......... 251/129.02, 251/284, 321, 322, 323; 137/517, 519, 519.5
See application file for complete search history.

(56) References Cited

U.S. PATENT DOCUMENTS

| | | | |
|---|---|---|---|
| 3,234,961 A * | 2/1966 | Arnes ......................... 137/517 |
| 3,245,651 A | 4/1966 | Erickson ..................... 251/129 |
| 4,105,044 A * | 8/1978 | Davitt ........................ 137/517 |
| 4,312,380 A | 1/1982 | Leiber et al. ............ 137/627.5 |
| 4,676,273 A | 6/1987 | Stoltman ................ 137/625.61 |
| 4,949,752 A | 8/1990 | Nogle et al. .............. 37/596.17 |
| 4,998,559 A | 3/1991 | McAuliffe, Jr. ........ 137/596.17 |
| 5,065,784 A | 11/1991 | Davies et al. ................ 137/116 |
| 5,464,085 A | 11/1995 | Churchill ................... 192/85 R |
| 5,474,107 A * | 12/1995 | Hayes ...................... 137/625.5 |
| 5,503,184 A * | 4/1996 | Reinartz et al. ......... 137/625.3 |
| 6,206,038 B1 | 3/2001 | Klein et al. ............ 137/596.17 |
| 6,386,218 B1 | 5/2002 | Ness et al. ..................... 137/14 |
| 6,626,645 B2 * | 9/2003 | Okii et al. ................ 417/222.2 |
| 6,810,909 B2 | 11/2004 | Herbert et al. ......... 137/596.17 |
| 2002/0117216 A1 | 8/2002 | Ambrose et al. ...... 137/596.17 |
| 2003/0136449 A1 | 7/2003 | Boddy .................... 137/596.17 |
| 2004/0025948 A1 | 2/2004 | Herbert et al. ......... 137/596.17 |

* cited by examiner

*Primary Examiner*—Gregory Huson
*Assistant Examiner*—John K. Fristoe, Jr.
(74) *Attorney, Agent, or Firm*—Paul L. Marshall

(57) ABSTRACT

A solenoid-operated valve includes a valve body defining a valving bore for providing a path of communication between axially spaced inlet and outlet ports. A solenoid assembly is attached to the valve body and includes an inductor coil, a fixed flux guide and an armature, which is movable axially between a first position and a second position in response to electrical energization of the inductor coil. A valve member is disposed within the valving bore intermediate the inlet and outlet ports. An elongated control member interconnects the armature and the valve member for conjoined axial movement. A generally annular valve seat is disposed within the valving bore between the inlet port and valve member, the valve seat including a central through bore through which the control member extends.

18 Claims, 4 Drawing Sheets

NORMALLY OPEN HIGH FLOW HYDRAULIC PRESSURE CONTROL ACTUATOR

TECHNICAL FIELD

The present invention relates generally to hydraulic actuators, and more particularly, to solenoid operated hydraulic valves. More particularly still, the present invention relates to actuators suitable for application in automotive related hydraulic systems.

BACKGROUND OF THE INVENTION

Actuators, such as current-controlled, electro-hydraulic valves, are used in vehicles in anti-lock braking systems (ABS), traction control systems, stability control systems, automotive transmissions, and numerous other vehicular systems, as well as non-automotive industrial and commercial products. These valves typically use electrically controlled sliding plungers to selectively permit or prevent fluid flow through the actuator under particular circumstances, as required for the application. The plunger must be ferromagnetic, so that as current is passed through a wire coil that surrounds the plunger, the resulting magnetic force can move the plunger. Because of this aspect of its functionality, the plunger is sometimes referred to as an "armature". In typical configurations, a spring and/or fluid pressure biases the plunger to a "normal" position when the coil is not energized.

Hydraulic pressure control actuators typically have a fluid pressure source connected to an inlet port and provide pressure control or flow output to an outlet port for discharge to a sump or pressure source return. Two primary poppet-type actuator configurations exist, a "pro-seal", in which the inlet pressure creates a biased hydraulic force on a poppet acting to seal at a mating seat contact surface, and a "contra-seal", where the inlet pressure acts to break the seal at the actuator seat. Contra-seal configurations are preferred for normally open valves, inasmuch as the magnetic force created by the solenoid does not act against the supply pressure when the primary air gap is largest and, therefore the solenoid is producing the least magnetic forces. Pro-seal configurations are preferred for normally closed applications, inasmuch as the supply pressure will assist to keep the valve closed.

Using a contra-seal configuration for normally closed valves and pro-seal configuration for normally open valves requires the implementation of spring preloads that must surpass the hydraulic forces acting on the poppet, thus requiring larger solenoid magnetic packages. One of the limitations to exercise this rule of thumb is the customer-porting configuration requirement. When the supply pressure at the inlet port feeds radially into the poppet chamber and exhausts axially opposite of the poppet chamber in a normally open valve, traditional valve configurations will automatically create the undesired pro-seal pressure condition.

Known actuators employed in applications such as automotive transmission shift control have utilized a ball valve member disposed in the valving chamber with the ball moved with respect to a valve seat by an operating rod connected to the solenoid armature for controlling flow from the supply port to the valving chamber. However, actuators of this type have encountered instability and flutter of the ball valve member upon exposure to hydraulic transients in the system and vibration encountered by the transmission. Efforts to counteract such instability and valve flutter in solenoid operation transmission shift control valves have utilized stiffer bias springs acting against the ball valve. This results in greater force and increased power requirements for the solenoid. For applications requiring a plurality of shift control valves, a prohibitively high power consumption for the actuators is the result.

The aforesaid solenoid valves employing a ball valve member have been found particularly susceptible to flutter when the ball valve member is in a position to substantially restrict the flow or near the closed position when the flow velocity is increased over the valve seat. It therefore has long been desired to provide a simple and relatively low cost way or means of reducing or eliminating flutter in a solenoid operated pressure control valve and particularly valves of the type employing solenoid operation off of low voltage power supply widely employed in motor vehicle applications.

BRIEF DESCRIPTION OF THE INVENTION

Generally, the present invention provides a unique side-fed, contra-seal, normally open hydraulic pressure control actuator configuration with a side supply port and an axial outlet port. The proposed valve configuration achieves the desired contra-seal mechanism in a much less complex and smaller package size. It is a pull-type design that allows the higher magnetic forces to occur when the rod/poppet surface encounter the highest hydraulic forces. Additionally, the spring preload can be small, only needing to be high enough to withstand the internal vibration forces that may tend to close the valve. This avoids the necessity of solenoid magnetic circuit over design and minimizes resultant costs.

According to the preferred embodiment of the invention, the solenoid-operated valve includes a valve body having a valving chamber, which provides a communication path between axially separated inlet and outlet ports. A solenoid assembly is directly or indirectly attached to the valve body and includes an armature, which is movable in response to electrical energization of the solenoid. A valve member is located within the valving chamber at a location intermediate the inlet and outlet ports, and is interconnected to the armature by an elongated control member. Finally, a valve seat is rigidly disposed inside the valving chamber at a location intermediate the inlet port and the valve member, wherein, in application, the valve seat and the valve member cooperate to control flow through the valve.

According to another aspect of the invention, the valve member is poppet shaped and is integrally formed with the elongated control member. The rod extends coaxially through a center opening of an annular valve seat. This arrangement provides a structurally simple and robust design, which helps to minimize pressure drop within the valve.

According to another aspect of the invention, the end of the elongated control member opposite the valve member has features, such as spaced annular grooves formed on the outer circumferential surface thereof, which, in assembly, act to positively engage the armature such as by crimping. This arrangement provides an assembly of the armature, valve member and interconnecting control member which reciprocates in unison for precise valve opening and closing events.

According to yet another aspect of the invention, the solenoid-operated valve includes means providing an end of travel stop for the armature when the valve member is spaced from the valve seat. The stop is a simple abutment feature located within the valving chamber. Preferably, the stop member is affixed to the valve body and generally radially traverses enough of the valving bore to ensure contact with the valving member. In its simplest form, the stop member is an elongated pin extending radially through at least one radial bore in a wall of the valve body and extending at least partially into the valving bore.

According to still another aspect of the invention, the stop member is also operative to axially fix the valve seat within the valving bore by extending through aligned bores in said valving body wall and said valve seat. This arrangement has the advantage of simply and positively establishing the open end of travel of the valve element and ensures against any possible mispositioning of the valve seat, which, in turn, ensures positively establishing the closed end of travel of the valve element.

According to yet still another aspect of the invention, a surface feature is provided on the downstream, surface of the valve member facing the stop member, which, when in the open position, i.e. contacting, position, ensures against undesireable rotation or axial displacement if the valve member caused by fluid flow or vibration. This arrangement adds functionality to the solenoid-operated valve without adding cost, weight, part count or complexity.

These and other features and advantages of this invention will become apparent upon reading the following specification, which, along with the drawings, describes preferred and alternative embodiments of the invention in detail.

BRIEF DESCRIPTION OF THE DRAWINGS

The present invention will now be described, by way of example, with reference to the accompanying drawings, in which.

Figure 1:
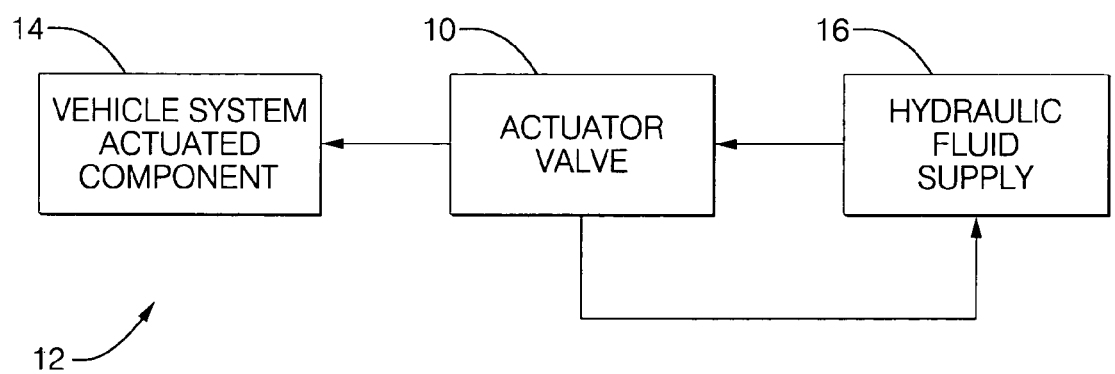
FIG. 1, is a simplified block diagram of a vehicle hydraulic system in which the present invention can be applied.

Corresponding reference characters indicate corresponding parts throughout the several views. Although the drawings represent one or more embodiments of the present invention, the drawings are not necessarily to scale and certain features may be exaggerated in order to better illustrate and explain the present invention. The exemplifications set out herein illustrate preferred and alternative embodiments of the invention and such exemplifications are not to be construed as limiting the scope of the invention in any manner.

DETAILED DESCRIPTION OF THE PREFERRED AND ALTERNATIVE EMBODIMENTS OF THE INVENTION

Referring initially to FIG. 1, a hydraulic pressure control actuator valve 10 is shown in a vehicle, generally designated 12. The valve 10 can be part of a fluid communication path of a control system of the vehicle 12 for operating a component 14 of the control system. The valve 10 may communicate with a hydraulic fluid supply reservoir 16.

The control system may be any suitable control system requiring actuators such as but not limited to transmission applications that use actuators to control the torque converter clutch (TCC) to smooth off-to-on position transitions, neutral-idle, and direct clutch gear shifting. The system may include various sensors and a processor in accordance with principals known in the art, with the processor selectively energizing and de-energizing the below-described coil of the actuator valve based on signals from the sensors as appropriate to control fluid flow through the system.

Figure 2:
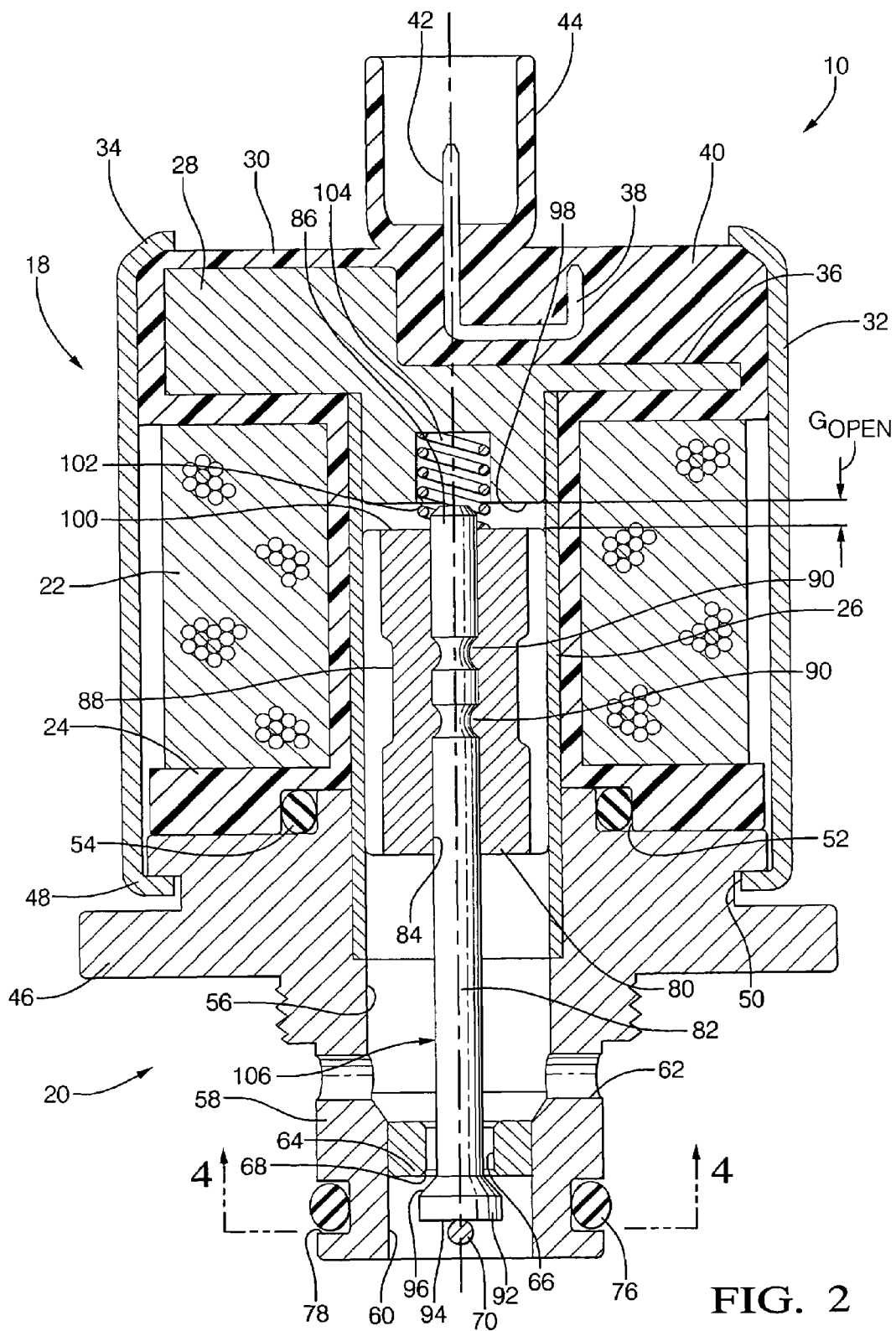
FIG. 2, is a longitudinal cross-sectional view of a hydraulic pressure control actuator embodying the present invention in the deenergized or normally open condition.

It is to be understood that while FIG. 2 shows a two-way, normally open valve 10 with various valve body structures, other configurations may be provided wherein the valve 10 might be normally closed and may be opened upon energization of the coil. The present invention applies to three-way valves as well. Thus, the particular structure shown in FIG. 2 is for illustration only, and is not to limit the invention to any particular valving structure apart from what is defined in the claims.

Referring to FIG. 2, hydraulic pressure control actuator valve 10 comprises a solenoid portion 18 and a valve portion 20. Solenoid portion 18 is illustrated as directly physically attached to the valve portion 20. However, they could also be interconnected through intermediate structure. Solenoid portion 18 includes a coil 22, preferably formed of copper wire, mounted on a bobbin or spool 24 preferably formed of insulating material such as plastic. A thin-walled, solenoid armature guide tube 26 preferably formed of non-ferrous metal is press fit within the inner diameter opening of the bobbin 24 and extends axially there through. The upper ends (as viewed in FIG. 2) of the bobbin 24 and guide tube 26 are covered by a primary end plate 28 preferably formed of ferrous metal which, itself, in turn, is covered on the top and circumferential outer surfaces thereof by an insulating end cover 30 formed of plastic or the like. A rigid, cylindrical, preferably ferrous metal outer housing or frame 32 circumferentially encloses coil 22, bobbin 24, guide tube 26, end plate 28 and cover 30, and is crimped 34 at the uppermost end thereof to axially and circumferentially secure the assembly as illustrated.

Primary end plate 28 has a recess 36 formed in the top surface thereof. Two electrically conductive members 38 (only one illustrated) are positioned within recess 36 so as to be spaced and electrically isolated from one another as well as the primary end plate 28. Each conductive member 38 is electrically connected to a lead (not illustrated) from coil 22 and held in the illustrated position by immersion in electrically insulating potting or overmolding material 40. A free end of each electrically conductive member 38 emerges upwardly through the potting material 40, to form an electrical terminal 42. Electrical terminals 42 are enclosed within an upwardly opening protective insulating connector housing 44 molded into or bonded to potting material 40. In application, connector housing 44 and terminals 42 would matingly engage a connector affixed to a wire harness (not illustrated) to electrically connect the coil 22 in-circuit with a power supply and control circuit existing in the host automotive vehicle 12.

A housing 46, preferably constructed of ferrous metal, closes the bottom ends of outer housing 32, bobbin 24, and guide tube 26. The bottom end of outer housing 32 is crimped 48 to engage housing 46 by extending into an outwardly opening circumferential recess 50 formed in housing 46. An annular gap 52 defined between the bobbin 24 and housing 46 encloses an internal o-ring 54 to establish a seal there between.

The lower end of guide tube 26 opens into a concentrically disposed axial through bore 56 formed in housing 46. The portion of housing 46 associated with valve portion 20 of the hydraulic pressure control actuator valve 10 is designated as a valve body 58. Through bore 56 constitutes a valving chamber, extending upwardly into the guide tube 26 and solenoid portion 18, and downwardly, axially exiting housing 56 at an outlet port 60. Radially extending inlet ports 62 communicate with through bore 56 at a point axially intermediate there along.

A generally annular valve seat 64 is interference fit within through bore 56 at a location axially intermediate inlet and outlet ports 62 and 60, respectively. Valve seat is constructed of precisely formed hardened steel or other suitable material to ensure maintenance of tight dimensional tolerances and long wear life. Valve seat 64 defines an axial through passage 66 concentric with through passage 56 and a downwardly facing, tapered valve member contact surface 68.

Figure 4:
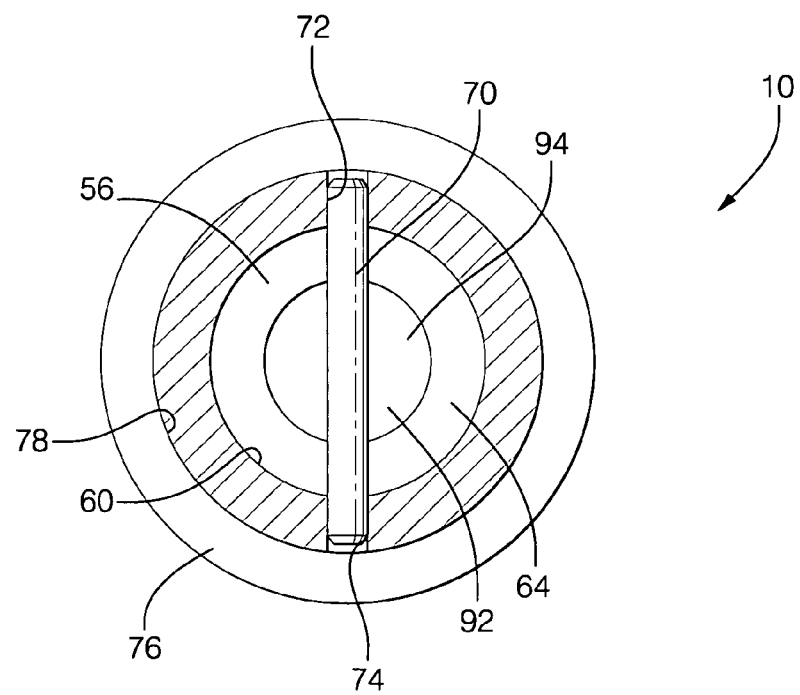
FIG. 4, is a cross-sectional view on an enlarged scale of the hydraulic pressure control actuator taken on lines 4-4 from FIG. 3.

Referring to FIGS. 2 and 4, an elongated, cylindrical steel stop pin 70 has its end portions press fit within concentric, axially aligned radial bores 72 and 74. The central portion of stop pin 70 radially traverses through bore 56 at a location axially adjacent outlet port 60. An external o-ring 76 resides within a radially outwardly opening circumferential groove 78 formed in the outer surface of valve body 58 near outlet port 60. Radial bores 72 and 74 outwardly exit valve body at an axial location intermediate the outlet port 60 and the circumferentially continuous line of sealing engagement between the o-ring 76 and the surfaces of groove 78. This assures that any fluid leakage through radial bores 72 and 74 will exit valve body axially below (downstream) of the effective sealing interface created by o-ring 76.

An armature 80 is slip fit within the inner diameter bore of guide tube 26 and is preferably constructed of ferrous metal. An elongated, generally cylindrical control member or control rod 82 constructed of non-ferrous material extends axially through a central bore 84 of armature 80 and terminates at its upper end (as viewed in FIG. 2) in a head portion 86. Armature 80 is permanently fixed to control rod 82 by radial deformation thereof in an axially central region 88. Control rod 82 has formed therein two or more axially spaced radially outwardly opening circumferential grooves 90 near its upper end within armature 80. When deformed, the armature 80 material flows into grooves 90.

The opposed (lowermost) end of control rod 82 transitions into an integral valve member 92. Valve member is formed as a flaired poppet-type valve defining an axially leading surface 94 facing stop pin 70 and a radially tapered seat contact surface 96 facing axially upstream towards the valve member contact surface 68 of valve seat 64. Valve member is constructed of precisely formed hardened steel or other suitable material to ensure maintenance of tight dimensional tolerances and long wear life. The lower end of control rod 82 extends freely entirely through and radially spaced from the through bore 66 of valve seat 64.

A portion of primary end plate 28 extends axially within guide tube 26, terminating in a downwardly facing fixed pole face 98. The upwardly facing top surface of armature 80 comprises a moving pole face 100, which is substantially parallel to fixed pole face 98.

A downwardly opening, axially disposed pocket 102 is formed in the primary end plate 28 axially concentric with the head portion 86 of control rod. A compressively loaded coil spring 104 is substantially disposed within pocket 102 to continuously press upwardly against primary end plate 28 and downwardly against armature 80. Head portion 86 is dimensioned to fit within pocket 102 and to radially position the end of spring bearing against armature 80.

As thus described, the assemblage of the armature 80, control rod 82 and valve member 92 is otherwise free for sliding displacement as a single element within guide tube 26 of solenoid portion 18 and through bore 56 of valve portion 20 of hydraulic pressure control actuator valve 10. Such sliding displacement is limited to a range of movement between two fixed limits of travel.

Referring to FIG. 2, the armature 80, control rod 82 and valve member 92 (hereinafter the armature-valve assembly 106) is illustrated in its first or de-energized limit of travel position. In this first position, the limit of travel is determined by the contact between the leading surface 94 of the valve member 92 and the stop pin 70. In this position, the valve is open, meaning that the inlet and outlet ports 62 and 60, respectively, are in free communication with one another. In this condition, the spacing or air gap defined by the space between pole faces 98 and 100 is at a maximum, designated as G-open.

Figure 3:
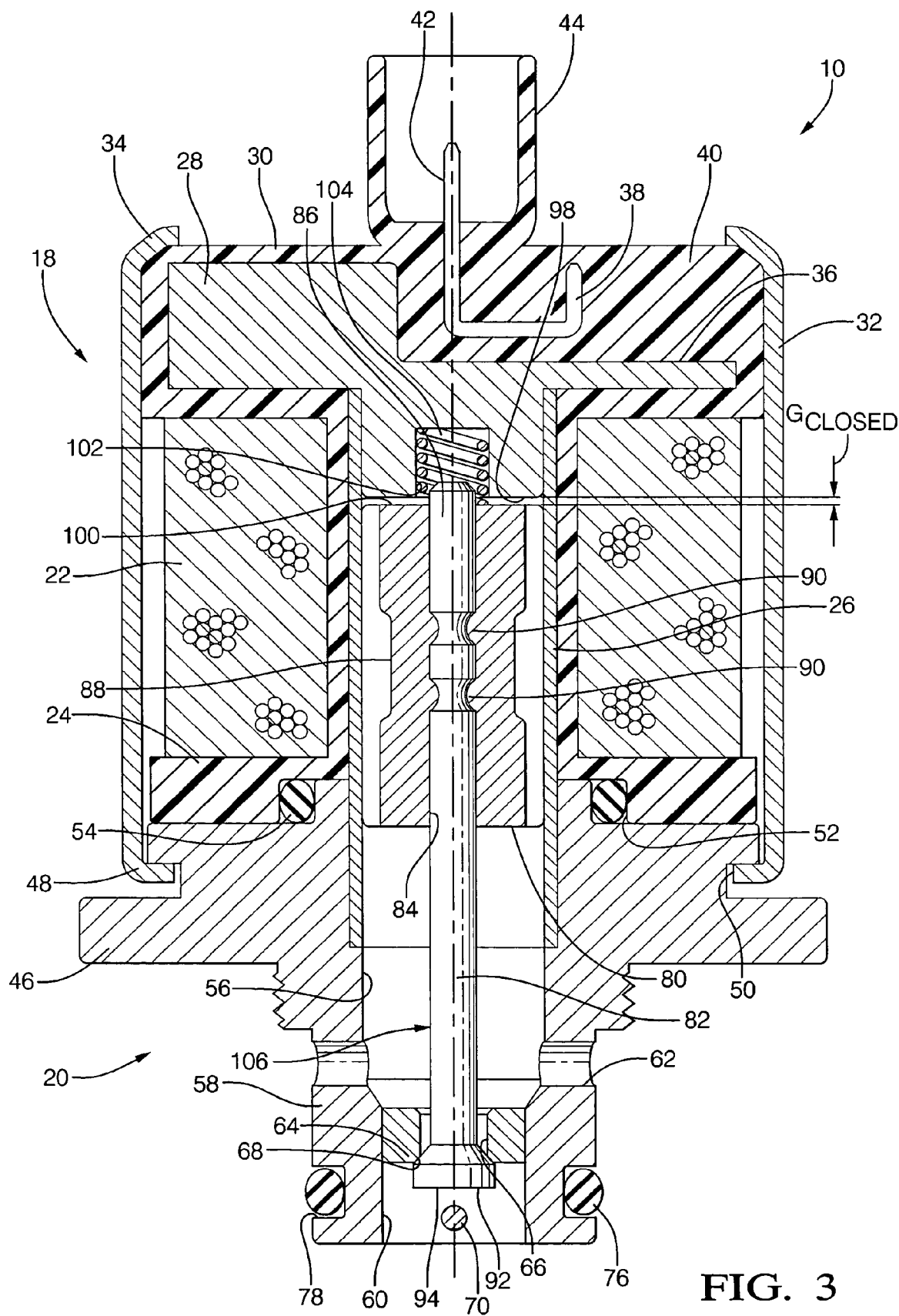
FIG. 3, is a longitudinal cross sectional view of the hydraulic pressure control actuator of FIG. 2, but in the energized or closed condition.

Referring to FIG. 3, the hydraulic pressure control actuator valve 10 of FIG. 2 is reprised with the sole exception that the armature-valve assembly 106 is translated to its second or energized limit of travel. In this second position, the limit of travel is determined by the point of contact of the valve member contact surface 68 of the valve seat 64 and the seat contact surface 96 of the valve member 92. In this position, the valve is closed, meaning that the inlet and outlet ports 62 and 60, respectively, are not in free communication with one another. In this condition, the spacing or air gap defined by the space between pole faces 98 and 100 is at a minimum, designated as G-closed.

The advantages of the ability to downsize the components of the solenoid magnetic circuit afforded by the present invention are manifest in the following simulation based force balance analysis. It is to be understood that the following is the result of one analysis based upon a single set of constants and that changing any of the constants or underlying assumptions can markedly alter the results.

With the hydraulic pressure control actuator valve 10 in the closed position as illustrated in FIG. 3, the source fluid pressure (Ps) at the inlet ports 62 is 6.0 bar. The maximum orifice inside diameter (id) is 9.04 mm. The hydraulic axial force component (Fh1) is 46.0 N. The axial spring force component (Fs1) is 1.0 N. Where static friction is designated as (SF), the magnetic force (Fm) of attraction between the pole faces 98 and 100 must exceed the value of $(1+SF)*(Fs1+Fh1)$. Note that in this position, with the small air gap G closed, the magnetic force applied to the armature-valve assembly 106 is at a maximum value.

With the hydraulic pressure control actuator valve 10 in the open position as illustrated in FIG. 2, the fluid will be flowing relatively freely through the opening formed between the valve seat through passage 66 and the control rod 82. The hydraulic axial force component (Fh1) is very low. The source fluid pressure (Ps) at the inlet ports 62 is 0.30 bar. Thus, the required magnetic force required to transition the armature-valve assembly 106 from the open position (FIG. 2) to the closed position (FIG. 3) is relatively small.

By way of contrast, push type solenoid mechanisms require substantially larger components of their solenoid magnetic circuit. A comparable non-piloted pro-seal push mechanism is characterizes as:

Closed position force balance: Ps=6.0 bar; Orifice id maximum=9.04 mm; and Fh1=41.0 N, where Fs1 is greater than (1+SF)*(Fh1) and Fm is greater than (1+SF)*(Fs1 (closed).

Open position force balance: Ps=0.30 bar; and Fh1 is very low, where Fs1 (open) is based on closed force and Fm is greater than (1+SF)*Fs1(open).

A comparable piloted pro-seal push mechanism is characterized as:

Closed position force balance: Ps=6.0 bar; Low Pressure Orifice Hydraulic Diameter max=9.30 mm; Poppet Head Outside Diameter (od)=12.9 mm; Hydraulic Force Advantage=0.92*Fh1; Fh1=41 N*0.08=3.28 N; High Pressure Orifice Hydraulic Diameter max=2.63 mm; and Fh2=3.26 N, where Fs2 is greater that (1+SF)*Fs2, and Fs1 (open) is greater than (1+SF)*Fs2 and Fm is greater than (1+SF)*Fs1 (closed).

Open position force balance: Ps=0.30 bar; and Fh1 is very low, where Fs1 (open) is based on closed position and Fm is greater than (1+SF)*Fs1 (open).

Valve member contact surface 68 and seat contact surface are symmetrically radially tapered to ensure self-axial alignment there between as the armature-valve assembly transitions from its first position to its second position.

Pocket 102 of primary end plate has adequate axial depth to ensure receipt of the nearly fully compressed compression spring 104.

Figure 5:
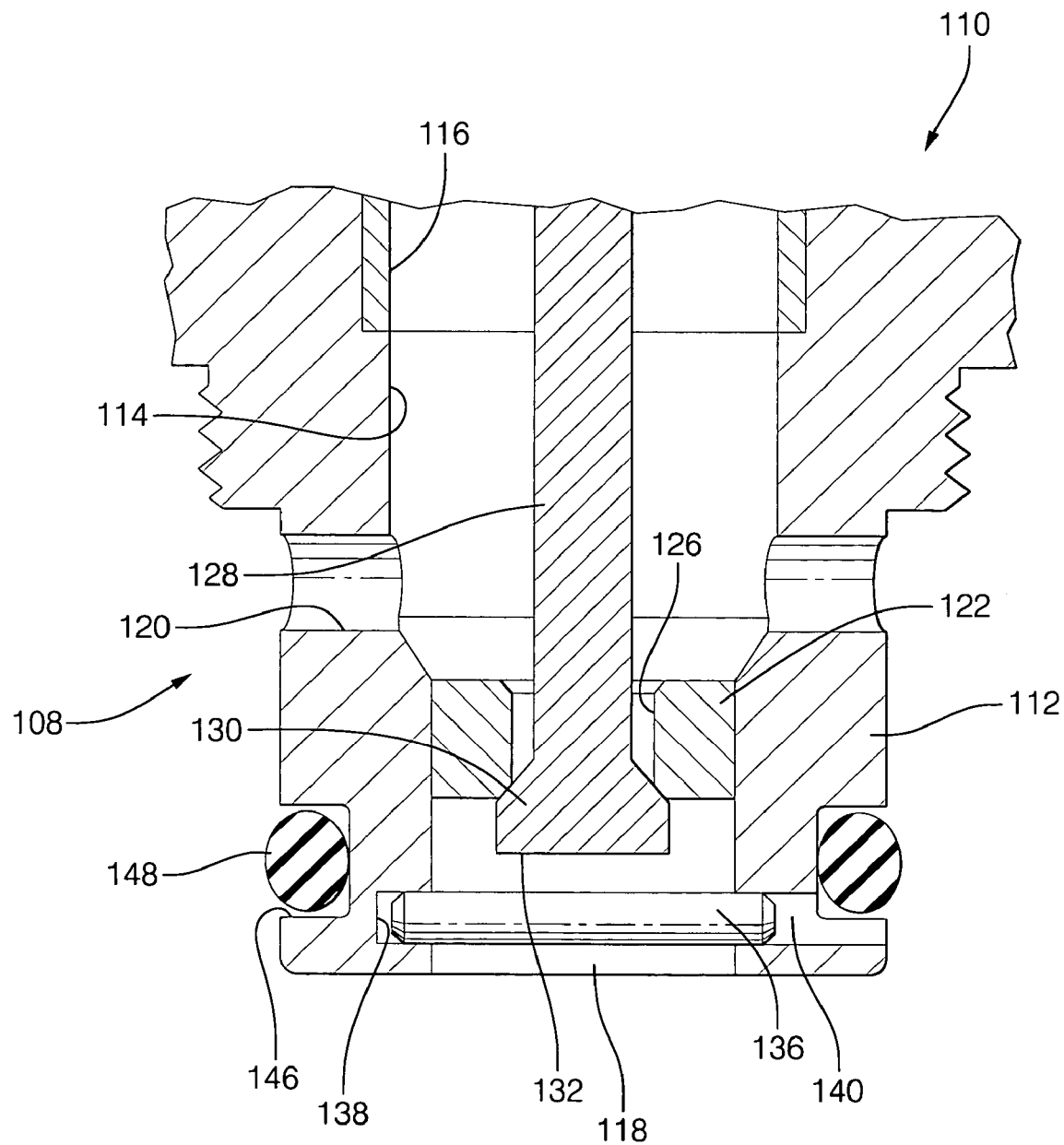
FIG. 5, is a broken, longitudinal cross-sectional view on an enlarged scale of an alternative embodiment of the hydraulic pressure control actuator.

Referring to FIG. 5, a broken sectional view of an alternative valve portion 108 of a hydraulic pressure control actuator valve 110 is illustrated. The alternative embodiment of the invention described in connection with FIG. 5 is identical in all material respects to the preferred embodiment described herein above in connection with FIGS. 1 through 4, with the sole exception of the features discussed herein below.

Valve portion 108 includes a valve body 112 defining an axially (vertically) extending through bore 114, which constitutes a valving chamber. Through bore 114 extends upwardly into an armature guide tube 116 and downwardly, exiting valve body 112 via an outlet port 118. An inlet port 120 extends radially through valve body 112, communicating with through bore 114 at an axial location spaced from outlet port 118.

An annular valve seat 122 is press fit within through bore 114 at a location axially intermediate inlet and outlet ports, 120 and 118, respectively. Valve seat 122 defines a through passage 126 aligned concentrically within through bore 114. An elongated control rod 128 is affixed to the armature (not illustrated) and extends downwardly within through bore 114 of valve body 112 and through bore 126 of valve seat 122, terminating in an integral valve member 130.

A stop pin 136 is rigidly affixed to valve body 112, press fit within concentric radial bores 138 and 140 formed in valve body axially intermediate outlet port 118 and valve member 130. Bore 138 is a blind bore, opening into through passage 114 and bore 140 is a through bore, traversing the side wall of valve body 112. Blind bore 138 serves as an axial stop for pin 136 as it is inserted within valve body 112.

Bore 140 opens radially outwardly onto a radially outwardly directed circumferential groove 146 formed on the outer surface of valve body 112. An o-ring 148 is disposed within groove 146 and effectively seals the open end of bore 140. Alternately, bore 140 and stop pin 136 can be axially repositioned above or below circumferential groove 146.

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basic constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. For example, the solenoid coil 22 can be placed in-circuit with the host vehicle 12 power/control circuit via a single terminal 42 (employing a ground return path), or more than two terminals 42, depending upon the electrical configuration of the coil 22. It is, therefore, to be understood that within the scope of the appended claims, wherein reference numerals are merely for illustrative purposes and convenience and are not to be in any way limiting, the invention, which is defined by the following claims as interpreted according to the principles of patent law, including the Doctrine of Equivalents, may be practiced otherwise than as specifically described.

The invention claimed is:

1. A solenoid operated valve comprising:
   a valve body forming a generally cylindrical elongated valving chamber having a first end and a second end;
   a radial inlet port disposed intermediate said first and second chamber ends and adapted for communicating said chamber with a fluid source;
   an axial outlet port disposed adjacent said second chamber end and adapted for communicating said chamber with a fluid sink;
   a solenoid assembly carried with said valve body and including an armature movable axially within said first chamber end in response to electrical energization thereof;
   a generally annular valve seat forming a reduced diameter central through passage affixed within said valving chamber axially intermediate said radial inlet port and said axial outlet port;
   a valve member disposed within said valving chamber axially intermediate said annular valve seat and said axial outlet port, said valve member cooperating with said valve member to control fluid flow within said valving chamber from said inlet port to said outlet port;
   an elongated control member disposed concentrically within said valving chamber, said elongated control member having one end affixed with said armature, an opposed end affixed with said valve member and an intermediate reduced diameter portion extending through said valve seat through passage, whereby said valve member and control member are axially displaceable with said solenoid armature; and
   an elongated pin extending radially though at least one radial bore in a wall of said valve body and extending at least partially into said valving chamber to establish an end of travel stop for said valve member and armature.

2. The solenoid operated valve of claim 1, wherein said valve member defines a seat contact surface generally facing said solenoid assembly.

3. The solenoid operated valve of claim 2, wherein said valve seat defines a valve member contact surface generally facing away from said solenoid assembly.

4. The solenoid operated valve of claim 3, wherein said seat contact surface and valve member contact surface are substantially mutually complementary in shape.

5. The solenoid operated valve of claim 4, wherein said seat contact surface and valve member contact surface are tapered to effect self axial alignment therebetween as the solenoid assembly transitions from the first position to the second position.

6. The solenoid operated valve of claim 1, further comprising means operative to continuously bias said armature toward said first position.

7. The solenoid operated valve of claim 6, wherein said biasing means is a compression spring.

8. The solenoid operated valve of claim 7, wherein said compression spring is disposed intermediate said armature and a fixed flux guide portion of said solenoid assembly.

9. The solenoid operated valve of claim 1, wherein said valve is in an open condition for the flow of fluid therethrough when said armature is in said first position.

10. The solenoid operated valve of claim 1, wherein said valve is in a closed condition obstructing the flow of fluid therethrough when said armature is in said second position.

11. The solenoid operated valve of claim 1, wherein said second position is delimited by the point of contact of said valve member and said valve seat.

12. The solenoid operated valve of claim 1, wherein said valve member is a poppet type valve.

13. The solenoid operated valve of claim 1, wherein said elongated pin is disposed axially intermediate said valve member and outlet port.

14. The solenoid operated valve of claim 1, wherein said valve body comprises seal means circumscribing an exterior surface of said valve body at an axial position intermediate said inlet and outlet ports.

15. The solenoid operated valve of claim 14, wherein said radial bore is disposed axially intermediate said seal means and said outlet port.

16. The solenoid operated valve of claim 1, wherein said elongated control member is integrally formed with said valve member.

17. The solenoid operated valve of claim 16, wherein said elongated control member defines engagement features on an external surface thereof adjacent an end thereof opposite said valve member.

18. The solenoid operated valve of claim 17, wherein the engagement features of said elongated control member effect affixation with said armature whereby said armature, elongated control member and valve member translate between said first and second positions as a single, unified structure.

* * * * *